United States Patent
Sung et al.

(10) Patent No.: US 9,936,219 B2
(45) Date of Patent: Apr. 3, 2018

(54) METHOD AND APPARATUS FOR PROCESSING VIDEO SIGNALS

(71) Applicant: LG ELECTRONICS INC., Seoul (KR)

(72) Inventors: Jaewon Sung, Seoul (KR); Sehoon Yea, Seoul (KR); Moonmo Koo, Seoul (KR); Jin Heo, Seoul (KR); Taesup Kim, Seoul (KR); Jiwook Jung, Seoul (KR); Eunyong Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 183 days.

(21) Appl. No.: 14/442,669

(22) PCT Filed: Nov. 13, 2013

(86) PCT No.: PCT/KR2013/010275
§ 371 (c)(1),
(2) Date: May 13, 2015

(87) PCT Pub. No.: WO2014/077573
PCT Pub. Date: May 22, 2014

(65) Prior Publication Data
US 2016/0286228 A1    Sep. 29, 2016

Related U.S. Application Data

(60) Provisional application No. 61/748,755, filed on Jan. 4, 2013, provisional application No. 61/725,496, filed on Nov. 13, 2012.

(51) Int. Cl.
*H04N 19/513*    (2014.01)
*H04N 19/139*    (2014.01)
(Continued)

(52) U.S. Cl.
CPC ........ *H04N 19/513* (2014.11); *H04N 19/139* (2014.11); *H04N 19/176* (2014.11);
(Continued)

(58) Field of Classification Search
CPC .. H04N 19/513; H04N 19/139; H04N 19/176; H04N 19/52597; H04N 19/527; H04N 19/52; H04N 19/597
(Continued)

(56) References Cited

U.S. PATENT DOCUMENTS 5,991,443 A * 11/1999 Gallery .................. A63F 13/12
                                                          348/E7.071
2013/0242046 A1* 9/2013 Zhang ................ H04N 13/0048
                                                          348/43
(Continued)

FOREIGN PATENT DOCUMENTS

KR    10-2012-0040646 A    4/2012
KR    10-2012-0080122 A    7/2012
(Continued)

*Primary Examiner* — William C Vaughn, Jr.
*Assistant Examiner* — Jae N Noh
(74) *Attorney, Agent, or Firm* — Dentons US LLP

(57) ABSTRACT

According to the present invention, a method for processing video signals can determine an interview motion vector of a current block using an interview motion vector of a temporal neighboring block in consideration of a global motion vector. The present invention can obtain an accurate interview motion vector according to obtaining the temporal neighboring block of the current block in consideration of a motion change according to output sequence information and accordingly, can increase the accuracy of inter-prediction.

2 Claims, 7 Drawing Sheets

(51) Int. Cl.
  *H04N 19/52*     (2014.01)
  *H04N 19/597*    (2014.01)
  *H04N 19/527*    (2014.01)
  *H04N 19/176*    (2014.01)

(52) U.S. Cl.
  CPC ........... *H04N 19/52* (2014.11); *H04N 19/597* (2014.11); *H04N 19/527* (2014.11)

(58) Field of Classification Search
  USPC .................................................... 375/240.16
  See application file for complete search history.

(56) References Cited

U.S. PATENT DOCUMENTS

| | | | |
|---|---|---|---|
| 2014/0049605 A1* | 2/2014 | Chen .................... | H04N 19/597 348/43 |
| 2014/0078251 A1* | 3/2014 | Kang ................. | H04N 13/0048 348/43 |
| 2015/0201215 A1* | 7/2015 | Chen .................... | H04N 19/597 348/42 |
| 2015/0208083 A1* | 7/2015 | Koo ..................... | H04N 19/597 375/240.16 |

FOREIGN PATENT DOCUMENTS

| | | |
|---|---|---|
| KR | 10-2012-0088628 A | 8/2012 |
| WO | 2008-088175 A1 | 7/2008 |
| WO | 2012-144829 A2 | 10/2012 |

\* cited by examiner

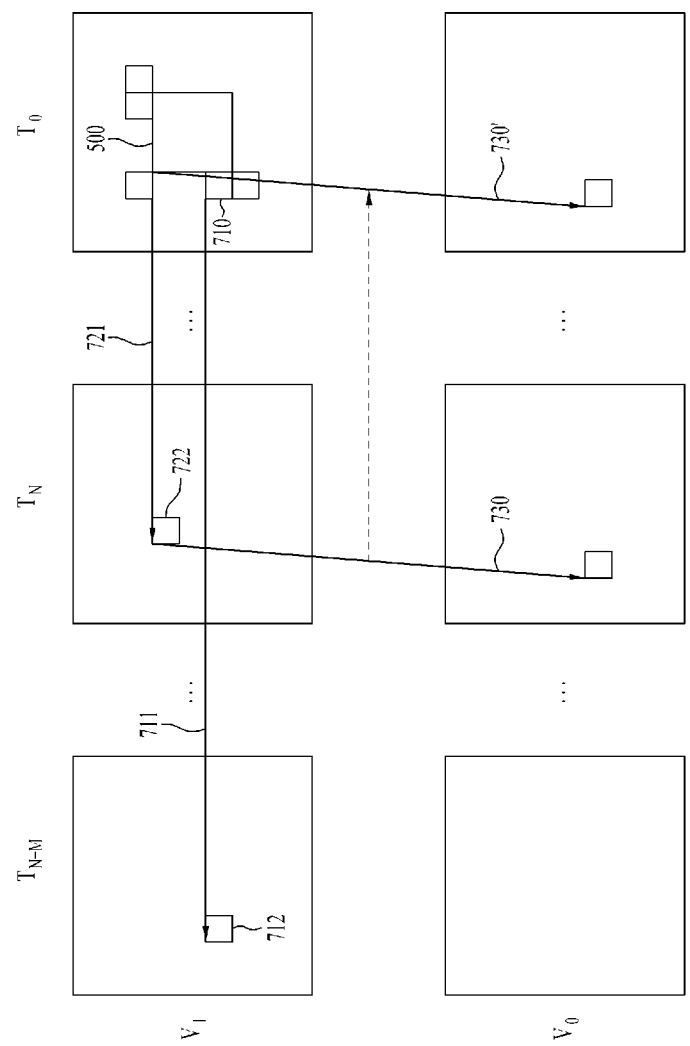

METHOD AND APPARATUS FOR PROCESSING VIDEO SIGNALS

This application is a National Stage Application of International Application No. PCT/KR2013/010275, filed Nov. 13, 2013, and claims the priority to and benefit of U.S. Provisional Application Nos. 61/748,755, filed Jan. 4, 2013, and 61/725,496 filed Nov. 13, 2012, all of which are hereby incorporated by reference in their entirety for all purposes as if fully set forth herein.

FIELD OF THE INVENTION

The present invention relates to a method and apparatus for processing video signals.

BACKGROUND ART

Compression coding refers to a series of signal processing technologies that can transmit digitalized information through a communication line, or that can store such information in a storage medium in an adequate format. Compression coding targets may include targets, such as voice, image (or video), text, and so on, and, most particularly, a technology performing compression coding on an image as its target is referred to as video image compression. A general characteristic of a multi-view image corresponds to having spatial redundancy, temporal redundancy, and interview redundancy.

DETAILED DESCRIPTION OF THE INVENTION

Technical Objects

An object of the present invention is to enhance coding efficiency of video signals.

Technical Solutions

In the present invention, a temporal neighboring block of a current block is obtained by using a global motion vector, and an interview motion vector of a current block is obtained by using an interview motion vector of a temporal neighboring block.

Additionally, the present invention performs scaling on a temporal motion vector of a spatial neighboring block by using output order information of a current picture having the current block included therein, output order information of a reference picture having a reference block of the spatial neighboring block included therein, and output order information of a picture having the temporal neighboring block included therein, thereby obtaining a temporal motion vector of the current block, and the present invention also obtains an interview motion vector of the current block by using the temporal motion vector of the current block.

Effects of the Invention

The present invention can obtain an accurate interview motion vector by obtaining the temporal neighboring block of the current block based upon a motion change respective to an output of sequence information, and, accordingly, the present invention may increase accuracy in inter-prediction.

Additionally, by obtaining an accurate interview motion vector, the size of the transmitted residual data may be reduced, thereby enhancing the coding efficiency.

BRIEF DESCRIPTION OF THE DRAWINGS

FIG. 7 illustrates an example of obtaining an interview motion vector of the current block by using a time motion vector of a spatial neighboring block, as an exemplary embodiment to which the present invention is applied.

BEST MODE FOR CARRYING OUT THE PRESENT INVENTION

Figure 1:
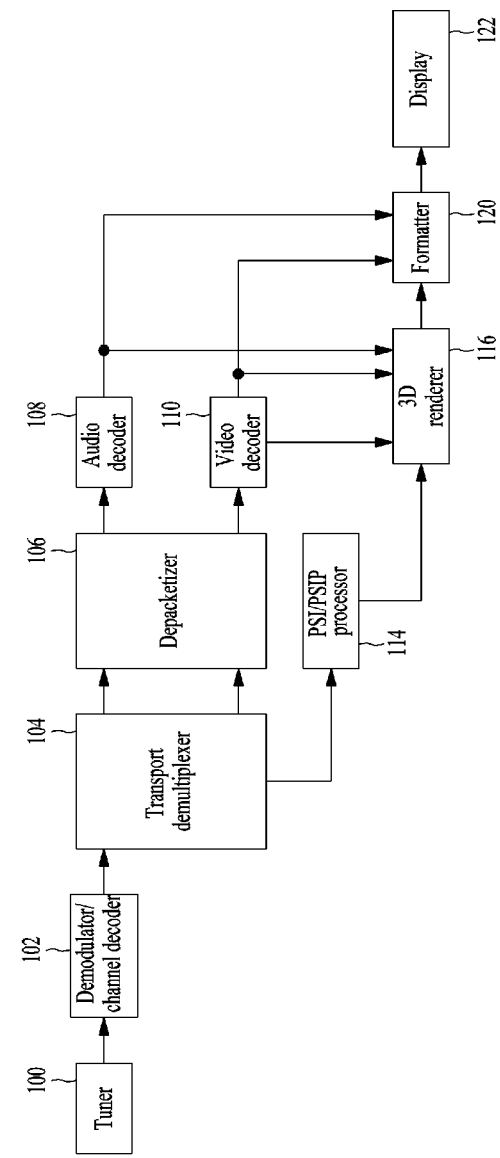
FIG. 1 illustrates an internal block view of a broadcast receiver having depth coding applied thereto, as an exemplary embodiment to which the present invention is applied.

The present invention corresponds to a video signal processing method and device configured to obtain a corresponding block within a temporal neighboring picture corresponding to a current block of a current picture by using a global motion vector, to obtain a temporal neighboring block by using the corresponding block, and to obtain an interview motion vector of the current block from the temporal neighboring block.

Additionally, the present invention corresponds to a video signal processing method and device including at least one of a center block of the corresponding block, a lower right side block of the corresponding block, and an upper left side block of the corresponding block.

Additionally, the present invention corresponds to a video signal processing method and device configured to, when obtaining an interview motion vector of the current block from the temporal neighboring block, search whether or not the temporal neighboring block corresponds to a block being coded by using an interview motion vector, and to obtain an interview motion vector of the current block from the temporal neighboring block being searched as the block coded by using an interview motion vector.

Additionally, the present invention corresponds to a video signal processing method and device configured to, when searching whether or not the temporal neighboring block corresponds to a block being coded by using an interview motion vector, perform the search by an order of the center block of the corresponding block, the lower right side block of the corresponding block, and the upper left side block of the corresponding block.

Additionally, the present invention corresponds to a video signal processing method and device configured to, when searching whether or not the temporal neighboring block corresponds to a block being coded by using an interview motion vector, perform the search by an order of the center block of the corresponding block and the lower right side block of the corresponding block.

Additionally, the present invention corresponds to a video signal processing method and device configured to, when searching whether or not the temporal neighboring block corresponds to a block being coded by using an interview motion vector, perform the search by an order of the center block of the corresponding block and the upper left side block of the corresponding block.

Additionally, the present invention corresponds to a video signal processing method and device configured to obtain a time motion vector of a spatial neighboring block, to scale the time motion vector of the spatial neighboring block, to obtain the scaled time motion vector by using a time motion vector of a current block, to obtain a temporal neighboring block by using the time motion vector of the current block, and to obtain an interview motion vector of the current block by using an interview motion vector of a temporal neighboring block.

Furthermore, the present invention corresponds to a video signal processing method and device configured to, when scaling the time motion vector of the spatial neighboring block, use output order information of a current picture having the current block included therein, output order information of a reference picture having a reference block of the spatial neighboring block included therein, and output order information of a picture having the temporal neighboring block included therein.

MODE FOR CARRYING OUT THE PRESENT INVENTION

A technology for compression coding or decoding multi-view video signal data is based upon (or considers) spatial redundancy, temporal redundancy, and redundancy existing between views. Additionally, in case of a multi-view image, in order to realize a 3-dimensional image, a multi-view texture image, which is taken (or captured) from two or more views, may be coded. Moreover, whenever required, depth data corresponding to the multi-view texture image may be further coding. When coding the depth data, it will be evident that compression coding can be performed based upon spatial redundancy, temporal redundancy, or interview redundancy. The depth data represent distance information between a camera and its respective pixel, and, in this specification, the depth data may be flexibly interpreted as information related to depth, such as depth information, depth image, depth picture, depth sequence, depth bitstream, and so on. Furthermore, in this specification, coding may include the concept of both encoding and decoding and shall be flexibly interpreted in accordance with the technical spirit and technical scope of the present invention.

FIG. 1 illustrates an internal block view of a broadcast receiver having depth coding applied thereto, as an exemplary embodiment to which the present invention is applied.

The broadcast receiver according to the embodiment of the present invention receives air wave (or sky wave) broadcast signals so as to playback (or reproduce) images. The broadcast receiver may use the received depth-associated information so as to create 3-dimensional contents. The broadcast receiver includes a tuner (100), a demodulator/channel decoder (102), a transport demultiplexer (104), a packet disassembler (106), an audio decoder (108), a video decoder (110), a PSI/PSIP processor (114), a 3D rendering unit (116), a formatter (120), and a display unit (122).

Among the plurality of broadcast signals being inputted through an antenna (not shown), the tuner (100) selects a broadcast signals of any one channel chosen by the user and outputs the selected signal. The demodulator/channel decoder (102) demodulates the broadcast signal outputted from the tuner (100) and performs error correction decoding on the demodulated signal, so as to output a transport stream (TS). The transport demultiplexer (104) demultiplexes the transport stream, separates (or splits) a video PES and an audio PES, and extracts PSI/PSIP information. The packet disassembler (106) disassembles the packets for the video PES and the audio PES, thereby recovering a video ES and an audio ES. The audio decoder (108) decodes the audio ES and outputs an audio bit stream. The audio bit stream is converted into an analog audio (or voice) signal by a digital to analog converter (not shown). Then, after being amplified by an amplifier (not shown), the amplified signal is outputted through a speaker (not shown). The video decoder (110) decodes the video ES so as to recover the original (or initial) image. The decoding process of the audio decoder (108) and the video decoder (110) may be performed based upon a packet ID (PID), which is verified by the PSI/PSIP processor (114). During the decoding process, the video decoder (110) may extract depth information. Also, the video decoder (110) may extract supplemental information that is required for creating images of a virtual camera view, e.g., camera information, or information for predicting an occlusion, which corresponds to a region that is covered by an obstacle (or object) located relatively in front of the camera (e.g., geometrical information, such as an outline (or silhouette) of the object, information on the transparency of the object, and color information), and so on, thereby providing the extracted information to the 3D rendering unit (116). However, according to another embodiment of the present invention, the depth information and/or supplemental information may be split (or separated) by the transport demultiplexer (104).

The PSI/PSIP processor (114) receives PSI/PSIP information from the transport demultiplexer (104) and parses the received information and stores the parsed information in a memory (not shown) or a register, thereby playing-back (or reproducing) the broadcast program based upon the stored information. The 3D rendering unit (116) uses the recovered image, the depth information, the supplemental information, and the camera parameters, so as to create depth information from a virtual camera position.

Also, by using the recovered image and the depth information from the virtual camera position, the 3D rendering unit (116) performs 3D warping, thereby creating an image from the virtual camera position. According to the embodiment of the present invention, although the 3D rendering unit (116) is described as a separate block of the video decoder (110), this is merely exemplary. And, therefore, the 3D rendering unit (116) may also be operated while being included in the video decoder (110).

The formatter (120) formats the image that is recovered during the decoding process, i.e., the image taken by an actual camera, and the image created by the 3D rendering unit (116) to best fit the display method of the corresponding receiver. Thereafter, the formatted 3D images are displayed through the display unit (122). Herein, the synthesis of the depth information and image of the virtual camera position performed by the 3D rendering unit (116) and the image formatting performed by the formatter (120) may be optionally performed in response to a user command. More specifically, the user may manipulate a remote controller (not shown) so that the synthesized image is not displayed, and the user may also use the remote controller to designate a time point at which the image synthesis is to be performed.

As described above, although the depth information is used by the 3D rendering unit (116) in order to create a 3D image, according to another embodiment of the present invention, the depth information may also be used by the video decoder (110). Hereinafter, various embodiments of the video decoder (110) using the depth information will now be described.

Figure 2:
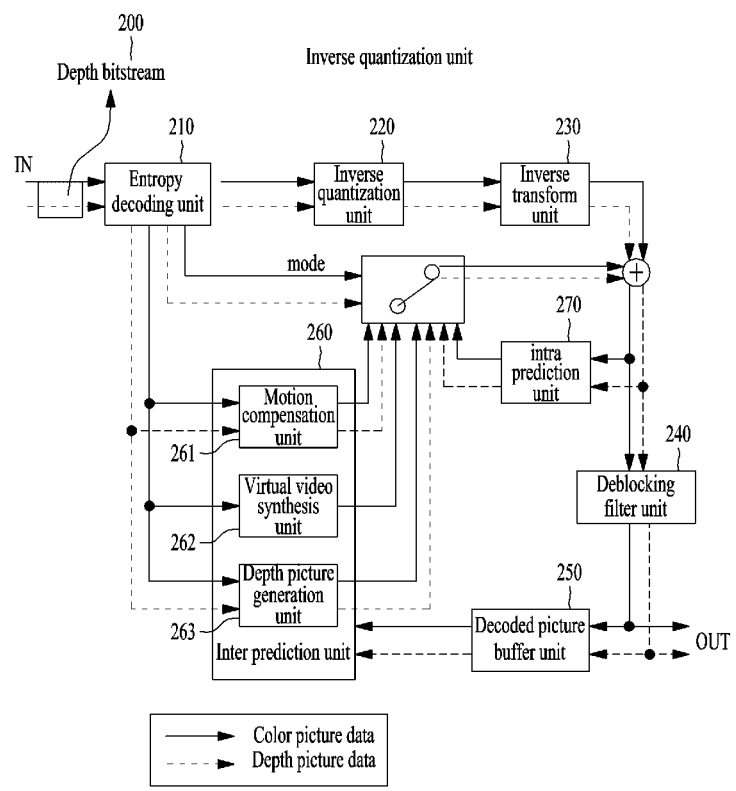
FIG. 2 illustrates a general block view of a video decoder, as an exemplary embodiment to which the present invention is applied.

FIG. 2 illustrates a general block view of a video decoder, as an exemplary embodiment to which the present invention is applied.

Referring to FIG. 2, the video decoder (110) may broadly include an entropy decoding unit (210), an inverse quantizing unit (220), an inverse converter (230), a deblocking filter unit (240), a decoded picture buffer unit (250), an inter predictor (260), and an intra predictor (270). Herein, the solid line represents a flow of the color picture data, and the dotted line represents a flow of the depth picture data. As described above, in FIG. 2, the color picture data and the depth picture data are shown to be different from one another. However, this may indicate that each data correspond to a different bit stream or may simply differentiate the flow of each data type within a single bit stream. More specifically, the color picture data and the depth picture data may either be transmitted as a single bit stream or be transmitted as separate bit streams. And, in FIG. 2, only the flow of the data is' shown, and this does not limit the data flow as being performed only in a single decoder.

First of all, in order to decoder the received depth bit stream (200), parsing is performed in NAL units. At this point, various types of depth-associated attribute information may be included in an NAL header area, an extension area of the NAL header, a sequence header area (for example, a sequence parameter set), an extension area of the sequence header, an extension area of a picture header, a slice header area, an extension area of the slice header, or a macro block header. Depth coding may be used as a separate codec. However, when depth coding is compatible with the convention codec, and only in case of a depth bit stream, it may be more efficient to add diverse attribute information. For example, depth identification information, which can identify whether or not the corresponding bit stream is a depth bit stream, may be added in the sequence header area (e.g., sequence parameter set) or the extension area of the sequence header. Depending upon the depth identification information, attribute information respective to the depth sequence may be added only when the inputted bit stream corresponds to the depth-coded bit stream.

The parsed depth bit stream (200) is entropy-decoded through the entropy decoding unit (210), and the coefficients of each macro block, movement vectors, and so on are extracted. The inverse quantizing unit (220) multiplies the received quantized value by a constant number, so as to obtain (or acquire) a converted coefficient value, and the inverse converter (230) performs inverse conversion on the coefficient value, thereby recovering the depth information of a depth picture. By using the recovered depth information of the current depth picture, the intra predictor (270) may perform an intra prediction. Meanwhile, the deblocking filter unit (240) applies deblocking filtering on each of the coded macro blocks in order to reduce block distortion. The filter softens the edge of each block, thereby enhancing the picture quality of a decoded frame. The selection of the filtering process may be decided based upon a boundary strength and a gradient of image samples located near the boundary. The depth pictures that are processed with filtering may either be outputted, or may be stored in the decoded picture buffer unit (250) in order to be used as reference pictures.

In order to perform inter prediction, the Decoded Picture Buffer unit (250) performs the role of either storing the depth pictures that were coded earlier, or exposing (or opening) the coded depth pictures. At this point, in order to perform storage or exposure in the decoded picture buffer unit (250), a frame_num and a POC (Picture Order Count) of each picture are used. Therefore, in performing depth coding, since the current depth picture and depth pictures located in other views among the picture that were coded in an earlier process, in order to use such pictures as the reference pictures, the frame_num and the POC as well as the depth view information, which can identify the viewpoint (or perspective) of a depth picture, may be collectively used.

Additionally, in order to create a reference picture list for predicting an interview prediction of the depth picture, the decoded picture buffer unit (250) may use the information on the depth view. For example, depth-view reference information may be used. Herein, the depth-view reference information refers to diverse sets of information used for indicating a dependency relation between the views of each depth picture. For example, such depth-view reference information may include a number of the whole depth views, a depth view identification number, a number of depth-view reference picture, a depth view identification number of the depth-view reference picture.

The decoded picture buffer unit (250) manages the reference pictures in order to realize inter prediction more flexibly. For example, a Memory Management Control Operation Method and a Sliding Window Method may be used. This is to integrate the memory of the reference pictures and the memory of the non-reference pictures to a single memory so as to manage a single integrate memory and to perform efficient management by managing a small memory. In performing depth coding, the depth pictures may be marked with a separate indication in order to be differentiated from the color pictures within the decoded picture buffer unit. And, during the marking process, information for identifying each depth picture may be used. The reference pictures that are being managed through such process may be used for depth coding by the inter predictor (260).

Referring to FIG. 2, the inter predictor (260) may include a motion compensating unit (261), a virtual view synthesizing unit (262), and a depth picture predicting unit (263).

The motion compensating unit (261) compensates for the motion (or movement) of the current block by using the diverse information transmitted from the entropy decoding unit (210). The motion compensating unit (261) extracts motion vectors respective to the neighboring blocks of the current block from the video signal and, then, obtains a motion vector prediction value of the current block. Thereafter, the motion compensating unit (261) compensates for the motion of the current block by using the motion vector prediction value and a difference vector being extracted from the video signal. Moreover, such motion compensation may be performed by using a single reference picture, or such motion compensation may also be performed by using multiple pictures. When performing depth coding, in case the current depth picture refers to a depth picture of another view, the motion compensating unit (261) may perform motion compensation by using information on a reference picture list for performing interview prediction of a depth picture, the information being stored in the decoded picture buffer unit (250). Furthermore, the motion compensating unit (261) may also perform motion compensation by using depth view information, which identifies a view of the depth picture.

Additionally, the Virtual View Synthesizing Unit (262) synthesizes a color picture of a virtual view by using a color picture of a view neighboring the view of the current color picture. In order to use color pictures of multiple views neighboring (or being adjacent to) one another, or in order to use color pictures of a wanted specific view, view identifying information indicating a view of the color picture may be used. In case of generating a color picture of the virtual view, flag information indicating whether or not to generate a color picture of the virtual view may be defined. In case the flag information indicates that the color picture of the virtual view is to be generated, the color picture of the virtual view may be generated by using the view identifying information. The color picture of the virtual view, which is obtained through the virtual view synthesizing unit (262), may be used as a reference picture, and, in this case, it will be evident that the view identifying information can also be allocated to the color picture of the virtual view.

According to another exemplary embodiment, the virtual view synthesizing unit (262) may synthesize a depth picture of a virtual view by using a depth picture that is positioned within a view that is neighboring the view of the current depth picture. Similarly, in order to indicate a view of the depth picture, depth view identifying information may be used. Herein, the depth view identifying information may be derived from the view identifying information of the corresponding color picture. For example, the corresponding color picture may have the same picture output order information and the same view identifying information as the current depth picture.

The depth picture generating unit (263) may generate the current depth picture by using depth coding information. Herein, the depth coding information may include distance parameter indicating a distance between the camera and the object (e.g., Z coordinate value of a camera coordinate system, and so on), macro block type information for performing depth coding, boundary identification information within a depth picture, information indicating whether or not the data within a RBSP include depth-coded data, or information indicating whether the data type corresponds to depth picture data or color picture data or parallax data, and so on. Additionally, the current depth picture may be predicted by using the depth coding information. In order words, inter-prediction using a depth picture neighboring the current depth picture may be performed, and intra-prediction using the decoded depth information within the current depth picture may also be performed.

The present invention relates to a method and device for obtaining a temporal neighboring block of a current block by using a global motion vector and for obtaining an interview motion vector from the temporal neighboring block.

Hereinafter, a method for obtaining an interview motion vector of a current block in the present invention will be described in detail with reference to FIG. 3.

Figure 3:
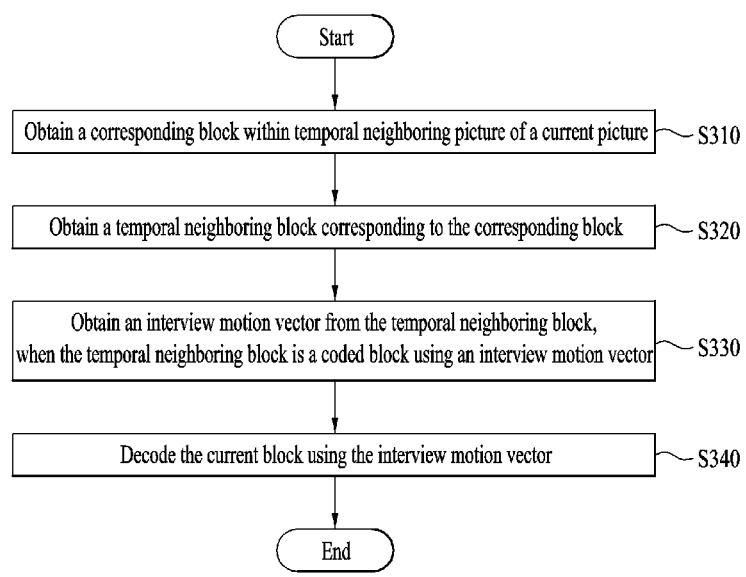
FIG. 3 illustrates a flow chart of a method for obtaining an interview motion vector of a current block, as an exemplary embodiment to which the present invention is applied.

FIG. 3 illustrates a flow chart of a method for obtaining an interview motion vector of a current block, as an exemplary embodiment to which the present invention is applied.

A corresponding block within a temporal neighboring picture corresponding to the current block may be obtained (S310). Herein, the corresponding block corresponds to a block within a temporal neighboring picture for deciding a temporal neighboring block of the current block. The corresponding block may correspond to a block that is located at the same position as the current block within the temporal neighboring picture. Alternatively, the corresponding block may correspond to a block within a temporal neighboring picture that is obtained by using a global motion vector. The global motion vector may designate a corresponding block within a temporal neighboring picture from the current block. The temporal neighboring picture may signify a picture having the same view as the current picture and having a time-point that is different from that of the current picture. Examples of obtaining the corresponding block of the current block will be described in more detail later on with reference to FIG. 4 and FIG. 5.

A temporal neighboring block of the current block may be obtained by using the corresponding block (S320). The temporal neighboring block may signify a block that corresponds to the current block within a temporal neighboring. Additionally, the temporal neighboring block may include a center block of the obtained corresponding block, a lower right side block of the corresponding block, and an upper left side block of the corresponding block. When obtaining the temporal neighboring block, the temporal neighboring block of at least one of the center block of the obtained corresponding block, the lower right side block of the corresponding block, and the upper left side block of the corresponding block may be obtained. Examples of obtaining a temporal neighboring block of the current block by using the corresponding block will be described in more detail later on with reference to FIG. 4 and FIG. 5.

In case the obtained temporal neighboring block corresponds to a block, which is coded by using an interview motion vector, the interview motion vector may be obtained from the temporal neighboring block (S330). A temporal neighboring block is searched in accordance with a pre-decided priority level, and, then, it is determined whether or not the searched temporal neighboring block corresponds to a block that is coded by using an interview motion vector, and, then, an interview motion vector of the current block may be obtained from the temporal neighboring block, which is coded by using the interview motion vector. Herein, the block that is coded by using the interview motion vector may signify an interview prediction block or a reference view temporal prediction block. An interview prediction block represents a block that is coded by using a reference block of another view, which is obtained by using the interview motion vector. And, a reference view temporal prediction block represents a block that is coded by using a temporal motion vector, which is obtained by using the interview motion vector. A method for searching for a temporal neighboring block and a method for obtaining an interview motion vector will be described in more detail later on with reference to FIG. 6.

The current block may be decoded by using the interview motion vector, which is obtained from the temporal neighboring block (S340).

Hereinafter, an example of obtaining a corresponding block of the current block and an example of obtaining a temporal neighboring block by using the corresponding block will hereinafter be described in detail with reference to FIG. 4 and FIG. 5.

Figure 4:
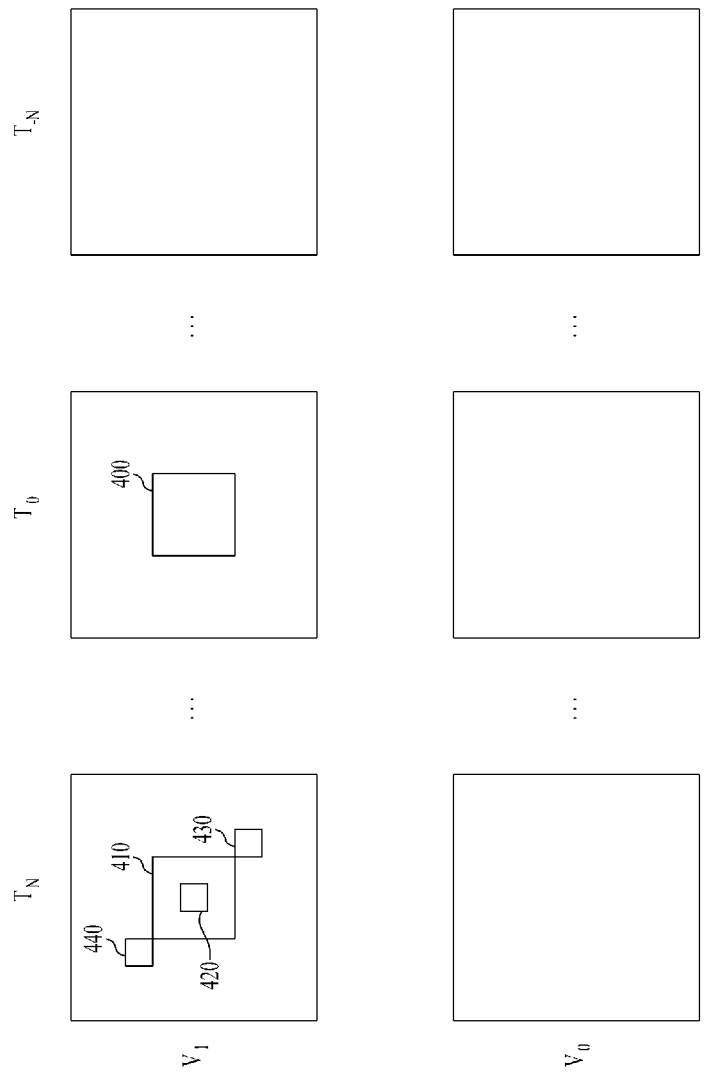
FIG. 4 illustrates an example of a corresponding block and a temporal neighboring block of the current block, as an exemplary embodiment to which the present invention is applied.

FIG. 4 illustrates an example of a corresponding block and a temporal neighboring block of the current block, as an exemplary embodiment to which the present invention is applied.

The corresponding block (410) may correspond to a block located at the same position as the current block (400) within a temporal neighboring picture. And, the size of the corresponding block (410) may be the same as the current block (400). For example, the corresponding block (410) may be defined as a block including pixel position (Xr,Yr) of a reference picture corresponding to position (Xc,Yc) of a center pixel of the current block (400). Alternatively, the corresponding block (400) may also be defined as a block including a position within the reference picture corresponding to a position of an upper left pixel of the current block (400).

Additionally, the center block (420) of the corresponding block may signify a block including a center pixel of the corresponding block (410). The center block (420) of the corresponding block may correspond to a block having the same size as the corresponding block (410) or a block having a size smaller than the corresponding block (410). The lower right side block (430) of the corresponding block may signify a block including a lower right side pixel of the corresponding block (410). And, the upper left side block (440) of the corresponding block may signify a block including an upper left side pixel of the corresponding block (410).

Figure 5:
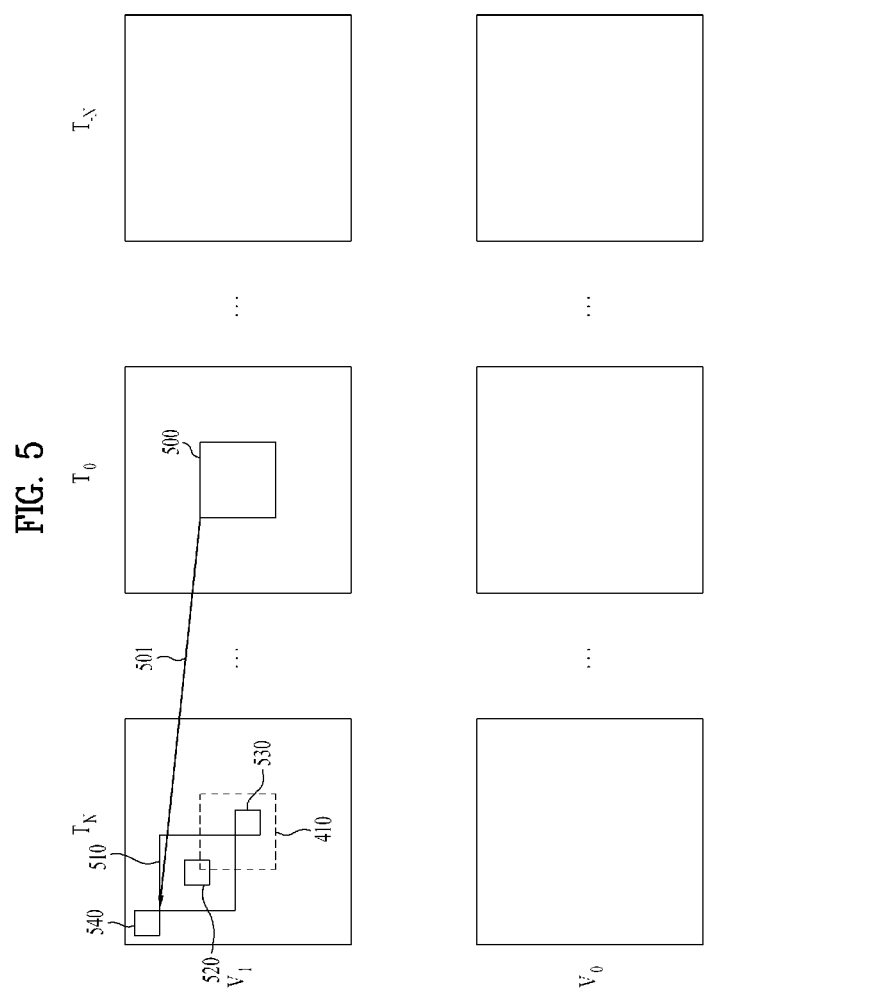
FIG. 5 illustrates an example of a corresponding block and a temporal neighboring block of the current block, as an exemplary embodiment to which the present invention is applied.

FIG. 5 illustrates an example of a corresponding block and a temporal neighboring block of the current block, as an exemplary embodiment to which the present invention is applied.

A corresponding block (510) may be obtained by using a global motion vector (501) (510). Herein, as information indicating the corresponding block within the temporal neighboring block, the global motion vector (501) may be used for obtaining a temporal neighboring block based upon a change in motion (or movement), which may exist between the current picture including the current block (500) and the temporal neighboring picture. The global motion vector (501) may be obtained from a bitstream, or the global motion vector (501) may also be obtained by using a global motion vector that had been used in a block other than the current block.

Referring to FIG. 5, if a global motion vector (501) is applied to the upper left side pixel of the current block (500), the global motion vector (501) may indicate a specific pixel within the temporal neighboring picture. A block including the pixel, which is indicated by the global motion vector (501), may be obtained as the corresponding block (510).

Alternatively, by applying the global motion vector to the center pixel of the current block (500), a block including the pixel, which is indicated by the global motion vector, may be obtained as the corresponding block.

Additionally, the center block (520) of the corresponding block may signify a block including the center pixel of the corresponding block (510). The center block (520) of the corresponding block may correspond to a block having the same size as the corresponding block (510) or a block having a size smaller than the corresponding block (510). The lower right side block (530) of the corresponding block may signify a block including a lower right side pixel of the corresponding block (510). And, the upper left side block (540) of the corresponding block may signify a block including an upper left side pixel of the corresponding block (510).

Hereinafter, an example of obtaining an interview motion vector of the current block from a temporal neighboring block will be described in detail.

The interview motion vector of the current block may be obtained by using an interview motion vector of a temporal neighboring block. In case multiple temporal neighboring blocks exist, whether or not a temporal neighboring block corresponds to a block that is coded by using an interview motion vector is searched in accordance with a pre-decided priority level, and, then, an interview of the current block may be obtained from the temporal neighboring block, which is coded by using the interview motion vector. In this specification, the significance of searching for the temporal neighboring block may indicate a search for whether or not the temporal neighboring block corresponds to a block that is coded by using an interview motion vector.

The pre-decided priority level according to which the temporal neighboring block is searched may be configured by diversely combining a center block of the corresponding block, a lower right side block of the corresponding block, and an upper left side block of the corresponding block.

All of the center block of the corresponding block, the lower right side block of the corresponding block, and the upper left side block of the corresponding block, which correspond to the above-described temporal neighboring block may be searched. For example, 1) after searching for the center block of the corresponding block, the lower right side block of the corresponding block may be searched, and, then, the upper left side block of the corresponding block may be searched. Alternatively, 2) after searching for the center block of the corresponding block, the upper left side block of the corresponding block may be searched, and, then, the lower right side block of the corresponding block may be searched. Alternatively, 3) after searching for the lower right side block of the corresponding block, the upper left side block of the corresponding block may be searched, and, then, the lower right side block of the corresponding block may be searched. Alternatively, 4) after searching for the lower right side block of the corresponding block, the center block of the corresponding block may be searched, and, then, the upper left side block of the corresponding block may be searched. Alternatively, 5) after searching for the upper left side block of the corresponding block, the center block of the corresponding block may be searched, and, then, the lower right side block of the corresponding block may be searched. Alternatively, 6) after searching for the upper left side block of the corresponding block, the lower right side block of the corresponding block may be searched, and, then, the center block of the corresponding block may be searched.

Alternatively, only a portion of the temporal neighboring block may also be searched. For example, 7) after searching for the center block of the corresponding block, only the upper left side block of the corresponding block may be searched. Alternatively, 8) after searching for the center block of the corresponding block, only the lower right side block of the corresponding block may be searched. Alternatively, 9) after searching for the upper left block of the corresponding block, only the lower right side block of the corresponding block may be searched. Alternatively, 10) after searching for the upper left block of the corresponding block, only the center block of the corresponding block may be searched. Alternatively, 11) after searching for the lower right block of the corresponding block, only the upper left block of the corresponding block may be searched. Alternatively, 12) after searching for the lower right block of the corresponding block, only the upper left block of the corresponding block may be searched. Alternatively, 13) only the center block of the corresponding block may be searched. Alternatively, 14) only the lower right side block of the corresponding block may be searched. Alternatively, 15) only the upper left block of the corresponding block may be searched.

Furthermore, when searching for a temporal neighboring block, in case the temporal neighboring block corresponds to an interview prediction block or a reference view temporal inter-prediction block, the temporal neighboring block may be determined to be a block that is coded by using an interview motion vector of the temporal neighboring block. Hereinafter, an example of obtaining an interview motion vector of the current block from the temporal neighboring block that is coded by using an interview motion vector will be described in detail with reference to FIG. 6.

Figure 6:
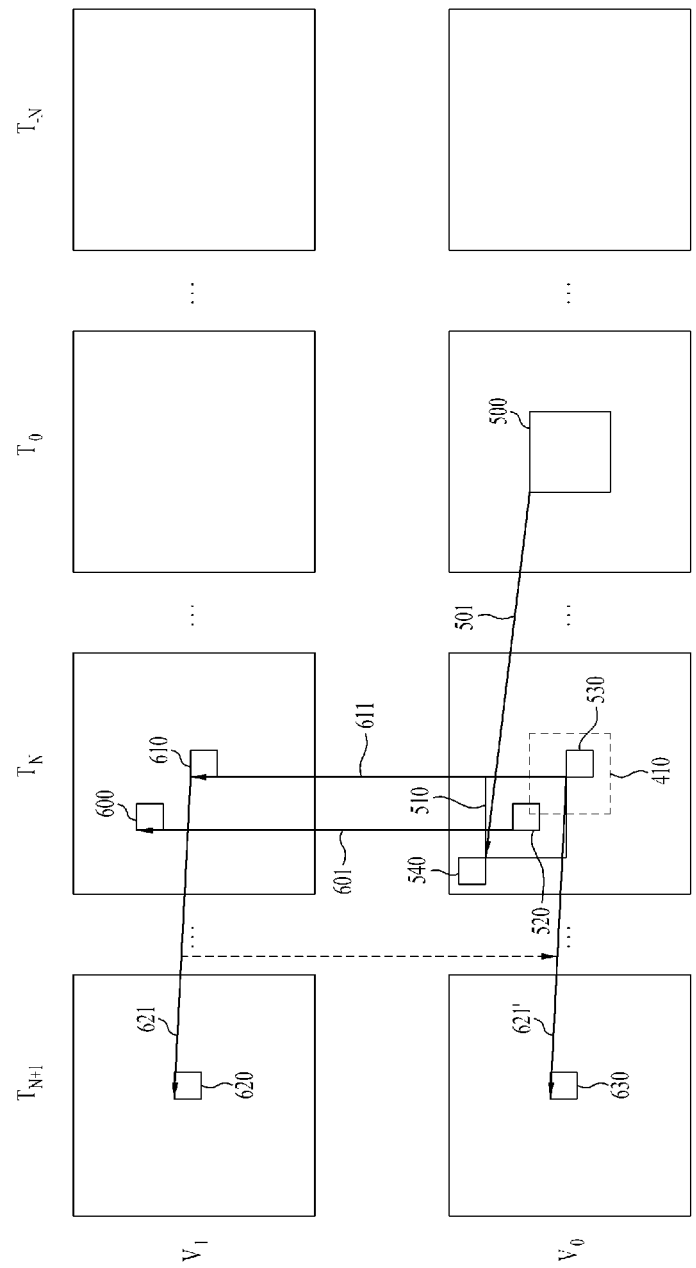
FIG. 6 illustrates an example of obtaining an interview motion vector of the current block from a temporal neighboring block, as an exemplary embodiment to which the present invention is applied.

FIG. 6 illustrates an example of obtaining an interview motion vector of the current block from a temporal neighboring block, as an exemplary embodiment to which the present invention is applied.

Referring to FIG. 6, as described above in FIG. 5, a temporal neighboring block of the current block (500) may be obtained by using a global motion vector (501).

Thereafter, as an interview prediction block, the center block (520) of the corresponding block corresponds to a block that is coded by using a first reference block (600) of another view, which is obtained by using a first interview motion vector (601). In case the center block (520) of the corresponding block is searched in accordance with a pre-decided priority level, the center block (520) of the corresponding block may be determined as a block that is coded by using an interview motion vector, and an interview motion vector of the current block (500) may be obtained by using the first interview motion vector (601), which was used for the coding of the center block (520) of the corresponding block.

As a reference view temporal inter-prediction block, the lower right side block (530) of the corresponding block represents a block that is coded by using a temporal motion vector (621'), which is obtained by using a second interview motion vector (611). In other words, in case a block (610) of another view that is indicated by the second interview motion vector (611) corresponds to a block that is coded by using a temporal motion vector (621), the temporal motion vector (621) that was used for the coding of the block (610) of another view may be used as the temporal motion vector (621') of the current block (500). In case the lower right side block (530) of the corresponding block is searched in accordance with a pre-decided priority level, the lower right side block (53) of the corresponding block may be determined as a block that is coded by using an interview motion vector, and an interview motion vector of the current block (500) may be obtained by using the second interview motion vector (611), which was used for the coding of the lower block (530) of the corresponding block.

Hereinafter, an example of obtaining an interview motion vector of the current block by using a time motion vector of a spatial neighboring block will be described in detail with reference to FIG. 7.

FIG. 7 illustrates an example of obtaining an interview motion vector of the current block by using a time motion vector of a spatial neighboring block, as an exemplary embodiment to which the present invention is applied.

In case the spatial neighboring block of the current block is coded by time inter prediction, a temporal neighboring block of the current block may be obtained by scaling a time motion vector of the spatial neighboring block. Additionally, in case a temporal neighboring block of the current block is coded by interview prediction, an interview motion vector of the current block may be obtained from the temporal neighboring block by using an interview motion vector. Herein, the time inter prediction corresponds to an inter prediction using a pixel value of a reference block within a reference picture, which has the same view as the current picture, which is positioned at a time-point that is different from that of the current picture, in order to obtain a prediction value of the current block. Moreover, as a block within the current picture being positioned in the surrounding area of the current block, the spatial neighboring block may include a lower left side neighboring block, a left side neighboring block, an upper right side neighboring block, an upper side neighboring block, and an upper left side neighboring block.

Additionally, a scaling process for obtaining a time motion vector of the current block may be represented by using a difference between information on an output order of the current picture and information on an output order of a reference picture of a spatial neighboring block, and by using a difference between information on an output order of the current picture and information on an output order of a picture having a temporal neighboring block included therein, as shown in Equation 1. Herein, the information on the output order (or output order information) may include a POC (Picture Order Count).

$$MV_{scaling} = \frac{curr_{POC} - col_{POC}}{curr_{POC} - ref_{POC}} sMV_{ref} \qquad \text{Equation 1}$$

In Equation 1, $curr_{POC}$ may represent an output order of the current picture including the current block, $ref_{POC}$ may represent an output order of a reference picture including a reference block of a spatial neighboring block, $col_{POC}$ may represent an output order of a picture having a temporal neighboring block included therein or an output order of a previous picture of the current picture, $MV_{ref}$ may represent a time motion vector of a spatial neighboring block, which is coded by time inter prediction, and $MV_{scaling}$ may represent a time motion vector of a scaled current block. Accordingly, Equation 1 may perform scaling on a time motion vector of a spatial neighboring block in accordance with a ratio of a difference between an output order of the current picture and an output order of a reference picture of a spatial neighboring block and ration of a difference between an output order of the current picture and an output order of a picture having a temporal neighboring block included therein.

Referring to FIG. 7, a left side neighboring block (710) of the current block (500) corresponds to a block that is coded by time inter prediction by using a time motion vector (711). A time motion vector (721) of the current block may be obtained by scaling the time motion vector (711) of the left side neighboring block, as shown in Equation 1. In case a temporal neighboring block (722) of the current block, which is indicated by the time motion vector (721) of the current block, is coded by using interview prediction, an interview motion vector (730') of the current block (500) may be obtained as an interview motion vector (730) of a temporal neighboring block (730).

As described above, a decoding/encoding device having the present invention applied therein may be equipped in a multimedia broadcast transmitting/receiving device, such as DMB (Digital Multimedia Broadcasting), so as to be used for deciding video signal and data signals, and so on. Additionally, the multimedia broadcast transmitting/receiving device may include a mobile communication terminal (or user equipment).

Additionally, the decoding/encoding device having the present invention applied therein may be fabricated as a program that is to be executed in a computer and may be stored in a recording medium that can be read by the computer, and multimedia data having a data structure according to the present invention may also be stored in a recording medium that can be read by the computer. The recording medium that can be read by the computer includes all types of storage devices storing data that can be read by the computer. Examples of the recording media that can be read by a computer may include ROMs, RAMs, CD-ROMs, magnetic tapes, floppy disks, optical data storing devices, and so on. Also, an exemplary recording medium being realized in the form of a carrier wave (i.e., transmission via Internet) may also be included. Furthermore, a bitstream that is generated by using the encoding method may either be stored in a recording medium that can be read by a computer or may be transmitted by using a wired/wireless communication network.

INDUSTRIAL APPLICABILITY

The present invention may be used for coding video signals.

What is claimed is:

1. A method for processing a video signal by a decoder, the method comprising:
    obtaining a global motion vector from the video signal;
    obtaining a corresponding block within a temporal neighboring picture corresponding to a current block of a current picture,
    wherein a position of the corresponding block is indicated by the obtained global motion vector, and the temporal neighboring picture is positioned at a same view as the current picture and at a different time than the current picture;
    obtaining temporal neighboring blocks by using the corresponding block,
    wherein the temporal neighboring blocks include a center block including a center pixel of the corresponding block, a lower right block including a lower right side pixel of the corresponding block, and an upper left block including an upper left side pixel of the corresponding block; and
    obtaining an inter-view motion vector of the current block from an inter-view motion vector for one of the temporal neighboring blocks,
    wherein obtaining the inter-view motion vector of the current block includes:
    when the center block is coded using the inter-view motion vector, determining the inter-view motion vector of the center block as the inter-view motion vector of the center block,
    when the center block is not coded using the inter-view motion vector and the lower right block is coded using the inter-view motion vector, determining the inter-view motion vector of the lower right block as the inter-view motion vector of the current block, and
    when the center block and the lower right block are not coded using the inter-view motion vector and the upper left block is coded using the inter-view motion vector, determining the inter-view motion vector of the upper left block as the inter-view motion vector of the current block.

2. A device for processing a video signal, the device comprising:
    an entropy decoder configured to obtain a global motion vector from the video signal; and
    an inter predictor configured to obtain a corresponding block within a temporal neighboring picture corresponding to a current block of a current picture, wherein a position of the corresponding block is indicated by the obtained global motion vector, and the temporal neighboring picture is positioned at a same view as the current picture and at a different time than the current picture, to obtain temporal neighboring blocks by using the corresponding block, wherein the temporal neighboring blocks include a center block including a center pixel of the corresponding block, a lower right block including a lower right side pixel of the corresponding block, and an upper left block including an upper left side pixel of the corresponding block, and to obtain an inter-view motion vector of the current block from an inter-view motion vector for one of the temporal neighboring blocks,
    wherein obtaining the inter-view motion vector of the current block includes:
    when the center block is coded using the inter-view motion vector, determining the inter-view motion vector of the center block as the inter-view motion vector of the center block,
    when the center block is not coded using the inter-view motion vector and the lower right block is coded using the inter-view motion vector, determining the inter-view motion vector of the lower right block as the inter-view motion vector of the current block, and
    when the center block and the lower right block are not coded using the inter-view motion vector and the upper left block is coded using the inter-view motion vector, determining the inter-view motion vector of the upper left block as the inter-view motion vector of the current block.

* * * * *